United States Patent [19]
Fukuda et al.

[11] Patent Number: 5,905,250
[45] Date of Patent: May 18, 1999

[54] AUDIO INFORMATION RECORDING/REPRODUCING SYSTEM

[75] Inventors: Hiroyuki Fukuda, Hachioji; Mutsumi Kikuchi, Akishima; Yoshikazu Akamine; Seiichi Wakamatsu, both of Hachioji, all of Japan

[73] Assignee: Olympus Optical Co., Ltd., Tokyo, Japan

[21] Appl. No.: 08/822,546

[22] Filed: Mar. 19, 1997

Related U.S. Application Data

[63] Continuation-in-part of application No. 08/359,066, Dec. 19, 1994, abandoned.

[30] Foreign Application Priority Data

Dec. 27, 1993 [JP] Japan ..................................... 5-348776

[51] Int. Cl.$^6$ ....................................................... G06K 7/10
[52] U.S. Cl. ......................... 235/472; 235/470; 235/482
[58] Field of Search .................................... 235/470, 472, 235/482

[56] References Cited

U.S. PATENT DOCUMENTS

| | | | |
|---|---|---|---|
| 4,604,065 | 8/1986 | Frazer ...................................... | 235/472 |
| 4,793,812 | 12/1988 | Sussman et al. ........................ | 235/472 |
| 4,890,230 | 12/1989 | Tanoshima ............................... | 235/472 |
| 5,128,526 | 7/1992 | Yoshida ..................................... | 235/470 |
| 5,331,111 | 7/1994 | O'Connell .................................. | 84/602 |
| 5,404,316 | 4/1995 | Klinger et al. .......................... | 364/514 |
| 5,446,791 | 8/1995 | Wooley et al. .......................... | 235/482 |
| 5,469,192 | 11/1995 | Allen et al. .............................. | 345/157 |

FOREIGN PATENT DOCUMENTS

| | | |
|---|---|---|
| 60-244145 | 12/1985 | Japan . |
| 5-328133 | 12/1993 | Japan . |
| WO 94/08314 | 4/1994 | WIPO . |

*Primary Examiner*—Harold Pitts
*Attorney, Agent, or Firm*—Frishauf, Holtz, Goodman, Langer & Chick

[57] ABSTRACT

A code information reading section selects recording codes which are respectively recorded on a plurality of recording media one at a time, and sequentially optically reads the recording codes in order to make it possible to synthesize a plurality of audio information items which are previously coded and recorded in an optically readable form and to simultaneously output them. A code information decoding section sequentially decodes the recording codes read by the code information reading section. A decoded information synthesizing section sequentially synthesizes digital audio signals sequentially decoded by the code information decoding section. A D/A converter converts the digital audio signal synthesized by the decoded information synthesizing section into an analog audio signal. An audio output section outputs the analog audio signal converted by the D/A converter as an audio output.

11 Claims, 12 Drawing Sheets

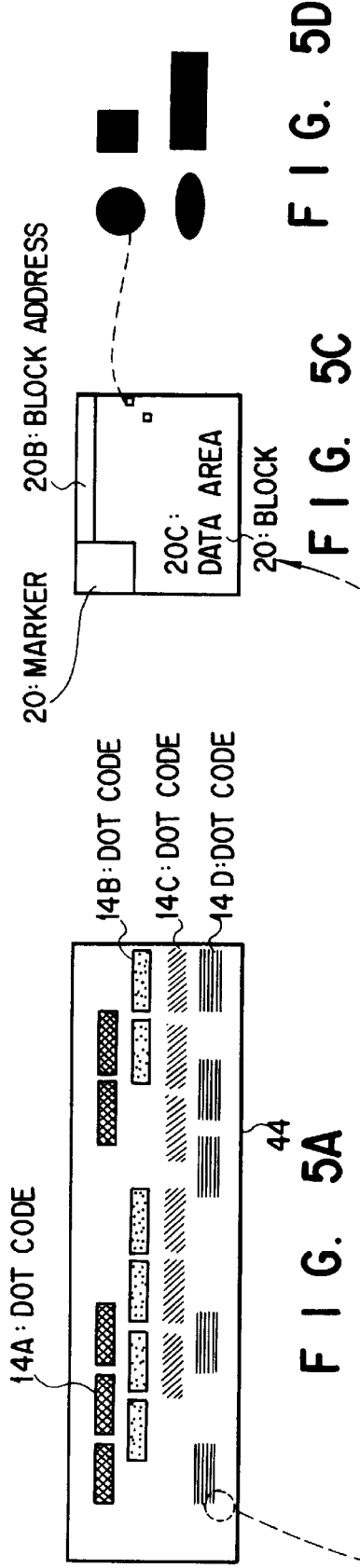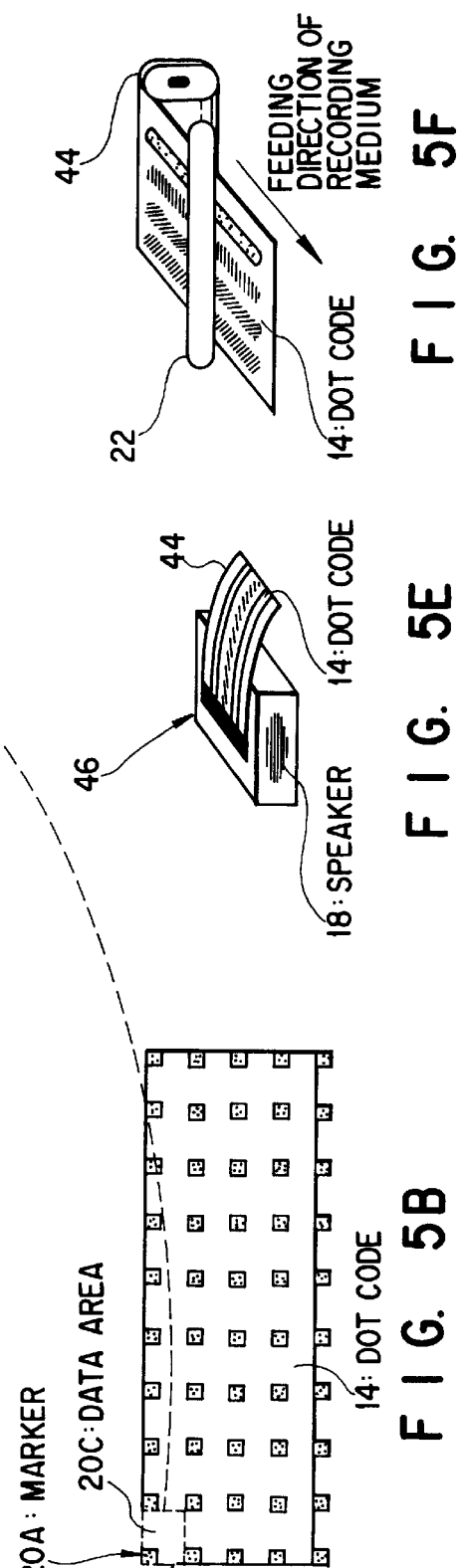

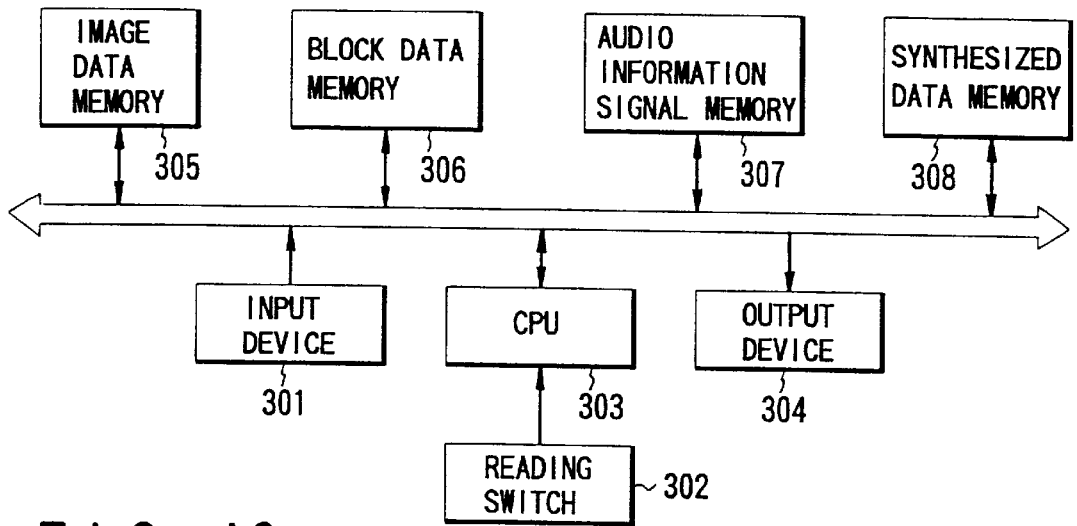
F I G. 10
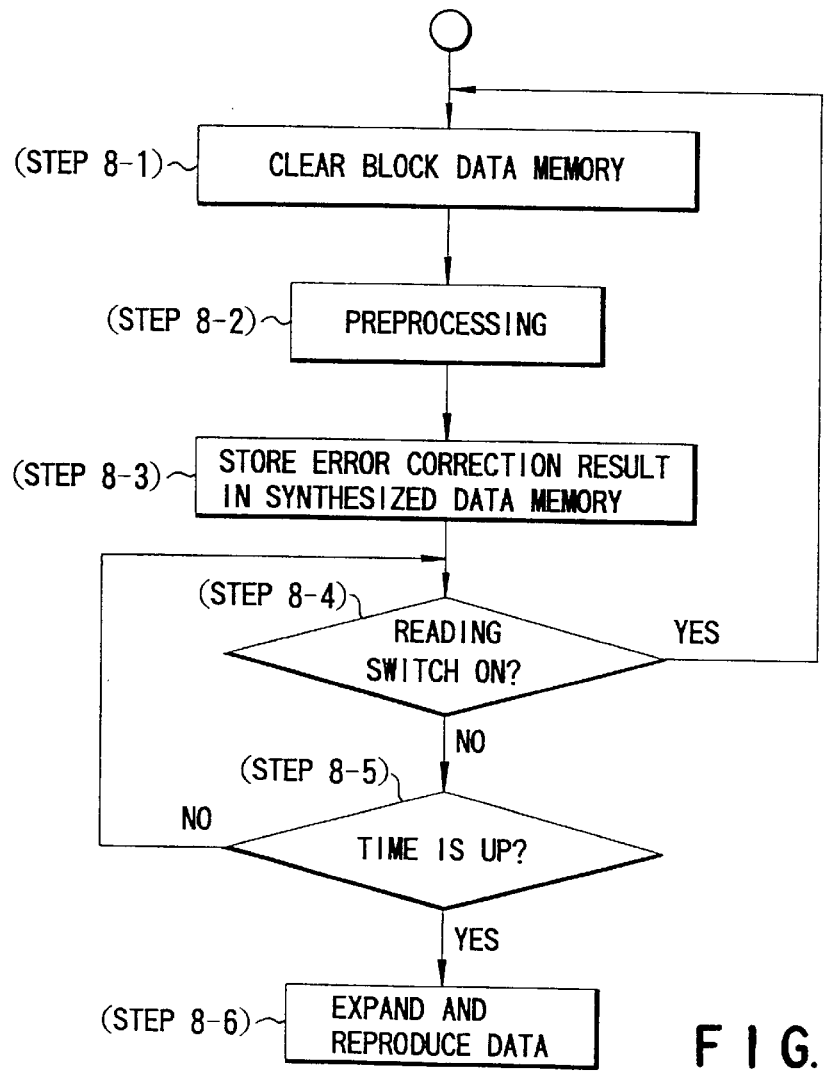
F I G. 11

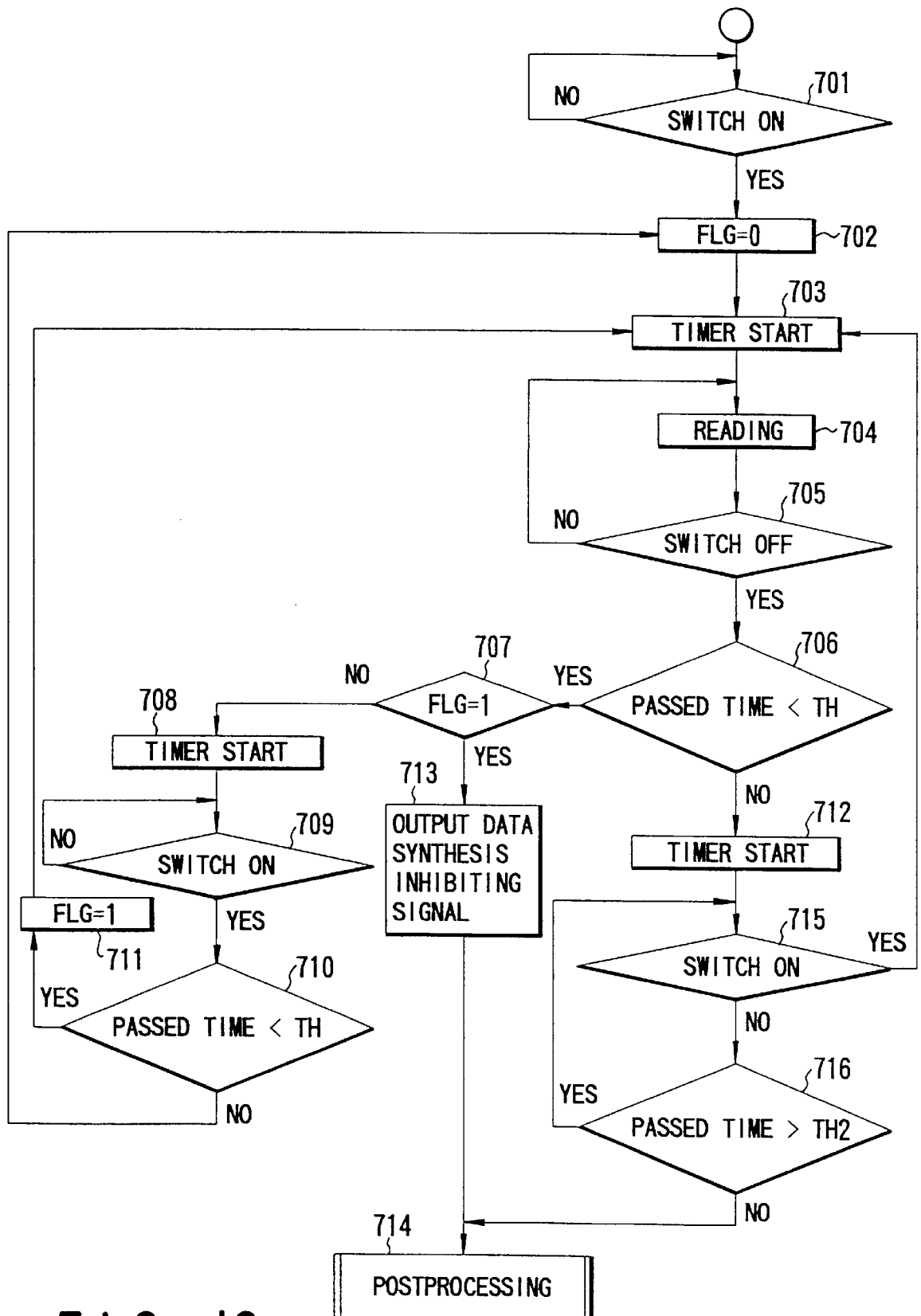
F I G. 12

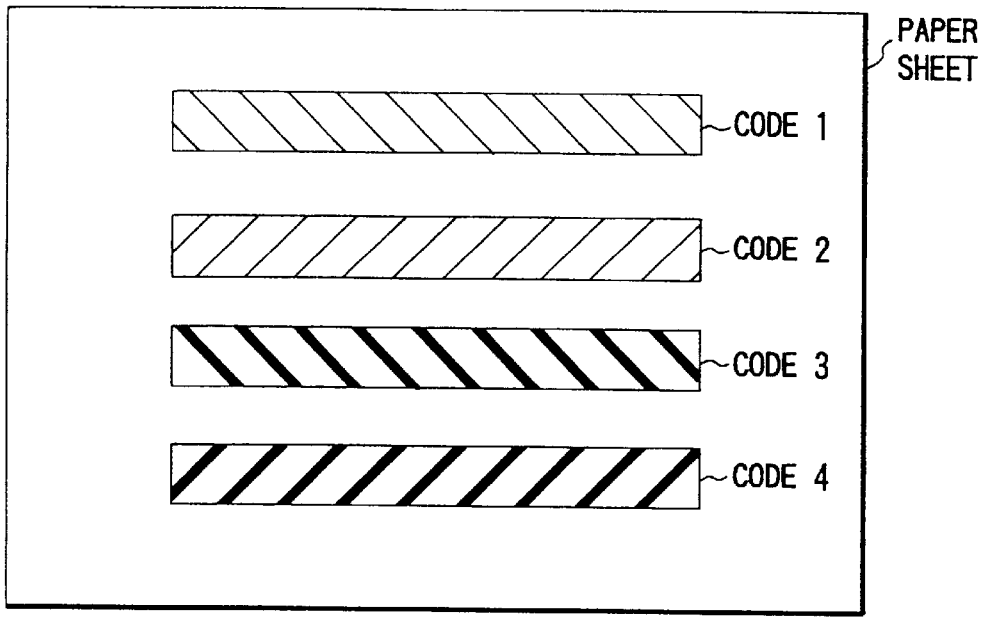
F I G. 13
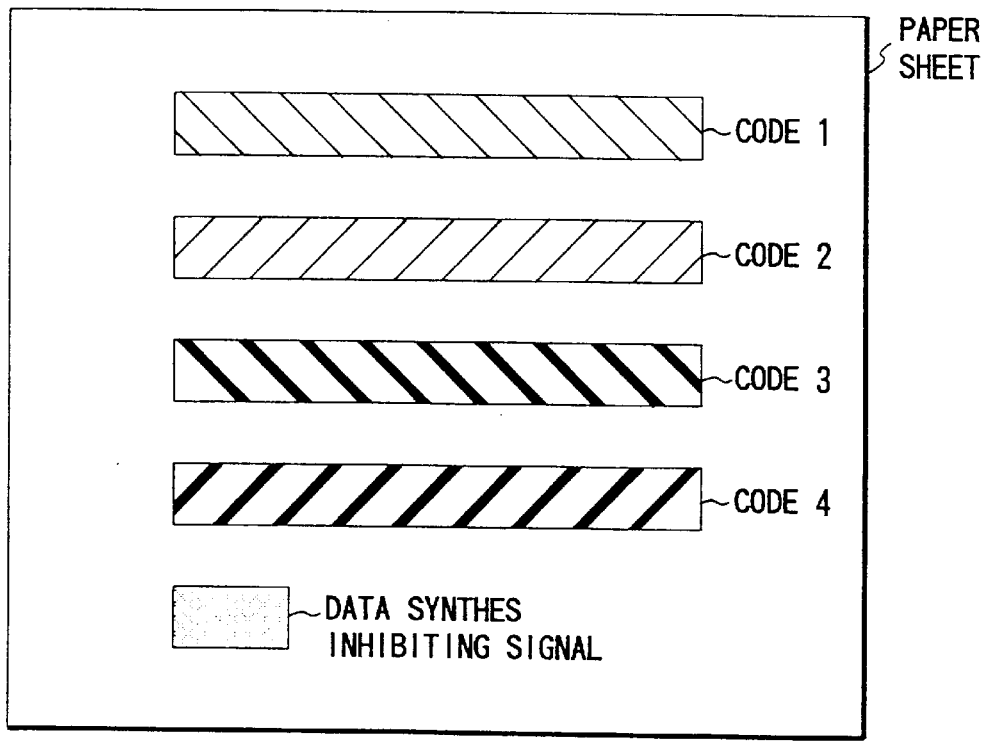
F I G. 14

AUDIO INFORMATION RECORDING/REPRODUCING SYSTEM

This application is a Continuation-In-Part, of application Ser. No. 08/359,066, filed Dec. 19, 1994, now abandoned.

BACKGROUND OF THE INVENTION

1. Field of the Invention

This invention relates to an audio information reproducing device in an audio information recording/reproducing system for recording audio information such as a voice in an optically readable form and reproducing the same.

2. Description of the Related Art

Conventionally, as a medium for recording a voice and music, various types of recording media such as a magnetic tape and optical disk are known.

However, even if these media are mass-produced, the unit price thereof is high and a large space is necessary for storing them.

Further, in a case where it becomes necessary to give or lend a medium on which a sound is recorded to a person living at a remote location, it is troublesome and takes a long time to send it by post or directly hand it over to him.

Therefore, it is considered to record audio information on paper in the form of image information which can be transmitted by facsimile and copied on a large scale.

For example, as is disclosed in Jpn. Pat. Appln. KOKAI Publication No. 60-244145, it is proposed to convert audio information into image information by converting a slight amount of sound into optical codes and to transmit the thus obtained image information by facsimile.

Further, in International Application PCT/JP 93/01377 by the assignee of the applicant of this invention (now published as WO 94/08314), an information recording/reproducing system is proposed which can reproduce multi media information including audio information such as voice, video information obtained from a video camera or the like and digital code information or the like from a recording medium in any place by a desired number of times by disposing a portion for optically reading a code from a recording medium on which the multi media information is recorded in the optically readable code form and then decoding the code into the original multi media information into a portable case so that a recording medium which has long-time multi media information including audio information recorded thereon can be used, and also a recording medium which can be used for the information recording/reproducing system is proposed.

However, it is not considered to freely select different audio information items recorded in a plurality of recording codes, synthesize them and simultaneously output them as an audio output in the device disclosed in the above KOKAI Publication or International Application in which audio information is converted into optically readable code information and is printed on one recording medium or printed after being transferred when a facsimile is used, and then the code information is read from the printed medium by use of optical reading means, and audio information is decoded again and output.

That is, as shown in FIG. 4C, the conventional audio information reproducing device includes a code information reading section 3 for optically reading recording codes 2 recorded on a recording medium 1, a code information decoding section 4 for decoding code information read by the code information reading section 3, a D/A converter 5 for converting digital audio information decoded by the code information decoding section 4 into an analog audio signal, and an audio output section 6 for outputting the analog audio signal converted by the D/A converter 5 as an audio output. In this conventional system, the recording codes on the recording medium can be reproduced only one at a time.

Therefore, even if audio information items for respective musical instruments (for respective parts) are separately printed in the optically readable code form on a musical score, for example, musical sounds of the respective musical instruments can only be separately reproduced and it is impossible to simultaneously output musical sounds in the same passage by use of a combination of desired musical instruments.

SUMMARY OF THE INVENTION

This invention has been made in order to solve the above problem and an object of this invention is to provide an audio information reproducing device which can repeatedly reproduce a desired sound among audio information such as a voice or music which is recorded in an optically readable form, synthesize desired sounds, simultaneously output the same, and efficiently reproduce the same.

In order to attain the above object, an audio information reproducing device according to this invention comprises reading means for selecting and sequentially optically reading a plurality of desired codes recorded on at least one recording medium from recording medium on which audio information converted in an optically readable code form is printed and recorded; reverse conversion means for sequentially reversely converting a plurality of codes read by the reading means into corresponding audio information items; synthesizing means for synthesizing audio information items reversely converted by the reverse converting means; and output means for outputting audio information synthesized by the synthesizing means.

Further, an audio information reproducing device according to this invention comprises reading means for optically reading a plurality of codes recorded on at least one recording medium from the recording medium on which audio information converted in an optically readable code form is printed and recorded; a plurality of reverse conversion means for reversely converting a plurality of codes read by the reading means into corresponding audio information items; synthesizing means for synthesizing audio information items reversely converted by the plurality of reverse converting means; and output means for outputting audio information synthesized by the synthesizing means.

That is, according to the audio information reproducing device of this invention, a desired number of codes recorded on at least one recording medium are selected and sequentially optically read from the recording medium on which audio information converted in the optically readable code form is printed and recorded by the reading means and then the plurality of codes thus read are sequentially reversely converted into corresponding audio information items by the reverse conversion means. The audio information items reversely converted by the reverse converting means are sequentially synthesized by the synthesizing means and then the synthesized audio information items are output by the output means.

Further, according to the audio information reproducing device of this invention, a plurality of codes recorded on at least one recording medium are optically read from the recording medium on which audio information converted in the optically readable code form is printed and recorded by the reading means and then the plurality of codes thus read are reversely converted into corresponding audio information items by the plurality of reverse conversion means. The plurality of reversely converted audio information items are synthesized by the synthesizing means and then the synthesized audio information items are output by the output means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detail description of the preferred embodiments given below, serve to explain the principles of the invention.

FIGS. 5A to 5D are views for illustrating an optically readable code recorded on a recording medium in a second embodiment of the invention;

FIGS. 5E and 5F are an external perspective view of an audio information reproducing device of the second embodiment and a view showing the positional relation between a detecting section and dot codes at the time of reading;

FIG. 10 is a block diagram showing another information reproducing device;

FIG. 11 is a flow chart showing the operation of the information reproducing device shown in FIG. 10;

FIG. 12 is a flow chart showing the operation of the information reproducing device shown in FIG. 10 in a specific example in which a double-click operation is performed;

FIG. 13 is an example of music data represented in MIDI data form;

FIG. 14 is an example of the music data including a data synthesis inhibiting code;

DETAILED DESCRIPTION OF THE PREFERRED EMBODIMENTS

Figure 1:
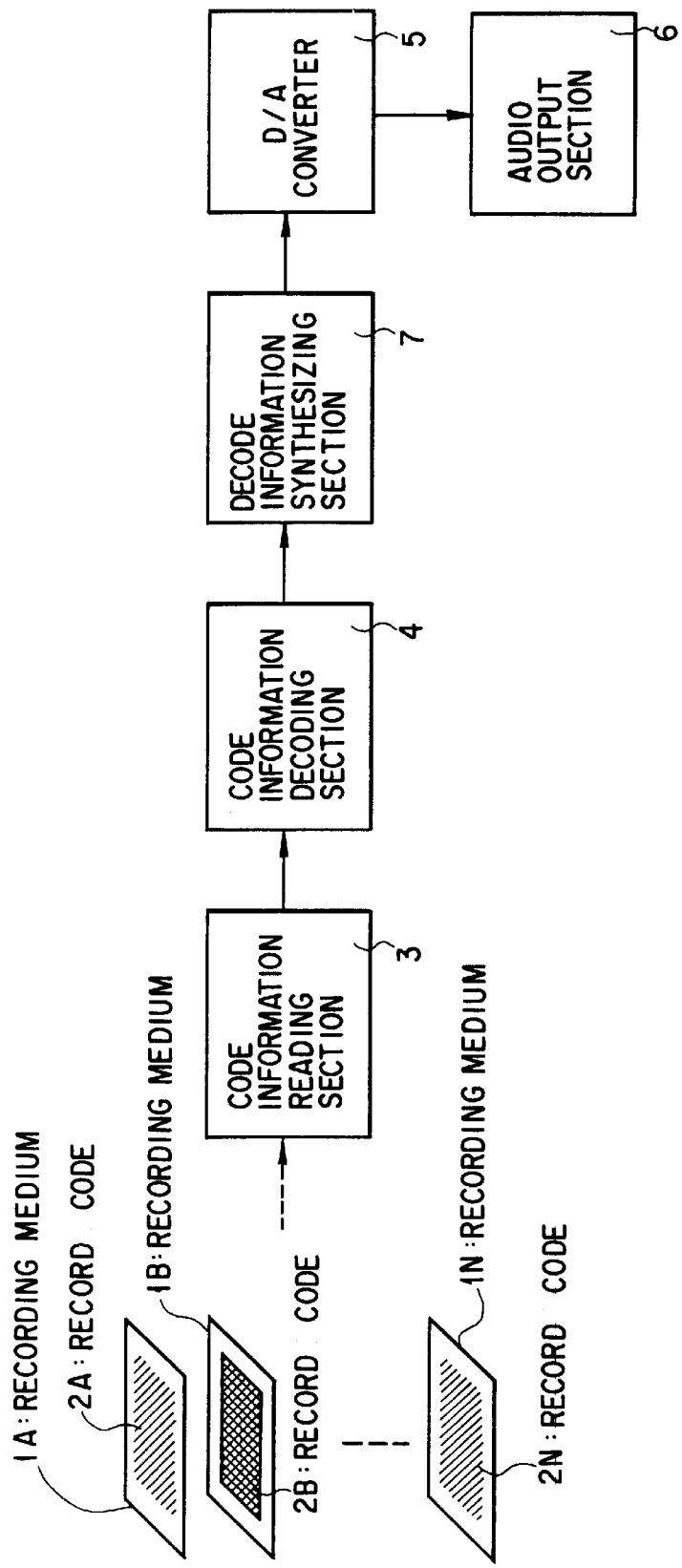
FIG. 1 is a diagram showing the schematic construction of a first embodiment of the invention.

Reference will now be made in detail to the presently preferred embodiments of the invention as illustrated in the accompanying drawings, in which like reference characters designate like or corresponding parts throughout the several drawings.

There will now be described a first embodiment of this invention with reference to the accompanying drawings.

Figure 4A:
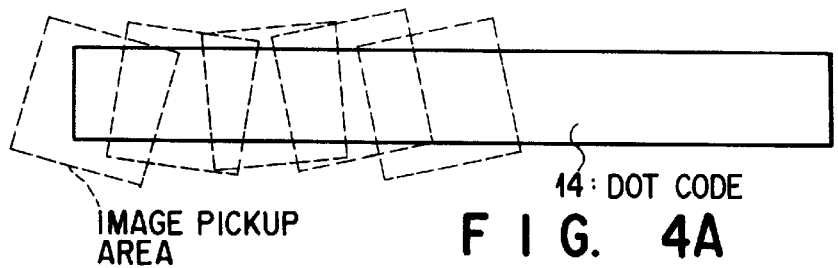
FIGS. 4A and 4B are views for respectively illustrating the manual scanning operation and the scanning/converting operation.
Figure 4B:
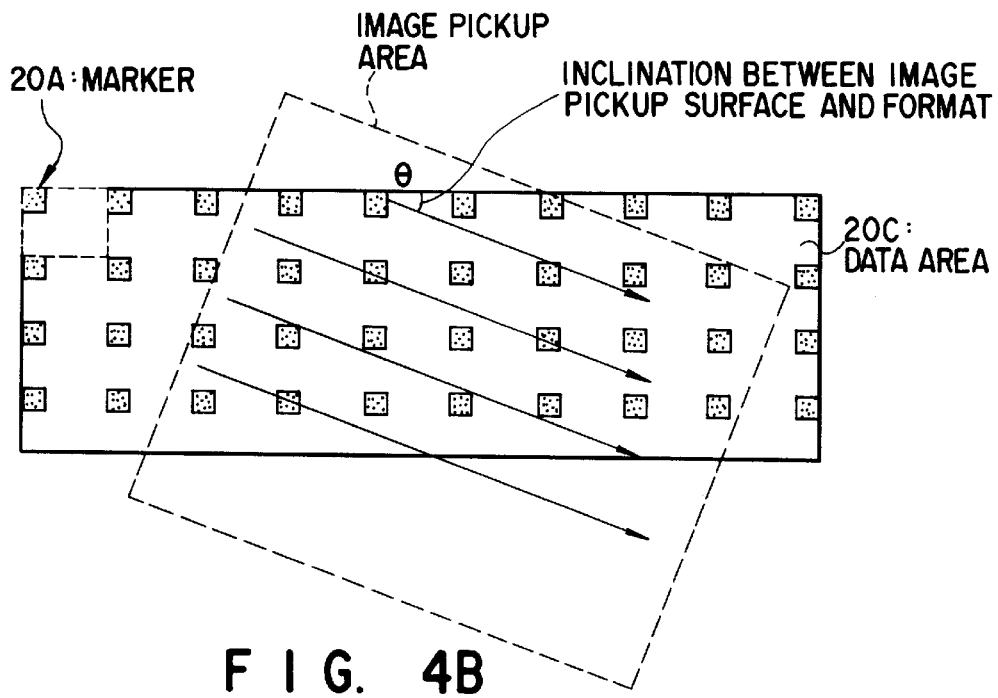
Figure 4C:
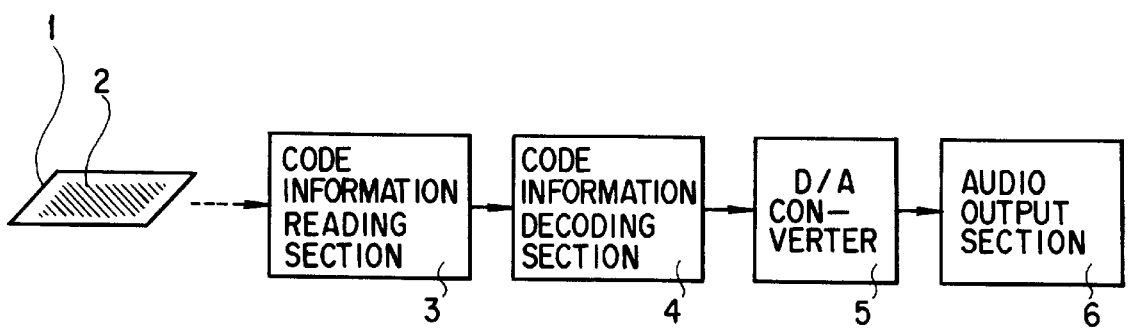
FIG. 4C is a diagram showing the schematic construction of the conventional audio information reproducing device.

FIG. 1 is a diagram showing the schematic construction of the first embodiment and the same reference numerals are attached to portions which are the same as those which are shown in FIG. 4C. That is, an audio information reproducing device of this embodiment includes a code information reading section 3 for selecting recording codes 2A, 2B, - - -, 2N which are obtained by previously subjecting desired audio information to the preset compression process and coding the same and respectively recorded on recording media 1A, 1B, - - -, 1N and sequentially optically reading the recording codes, a code information decoding section 4 for sequentially decoding the recording codes read by the code information reading section 3, a decoded information synthesizing section 7 for sequentially synthesizing digital audio signals sequentially decoded by the code information decoding section 4, a D/A converter 5 for converting the digital audio signal synthesized by the decoded information synthesizing section 7 into an analog audio signal, and an audio output section 6 for outputting the analog audio signal converted by the D/A converter 5 as an audio output.

In this case, the recording media 1A to 1N may be one sheet of recording medium. That is, a plurality of recording codes 2A to 2N may be recorded on one sheet of recording medium.

Figure 2:
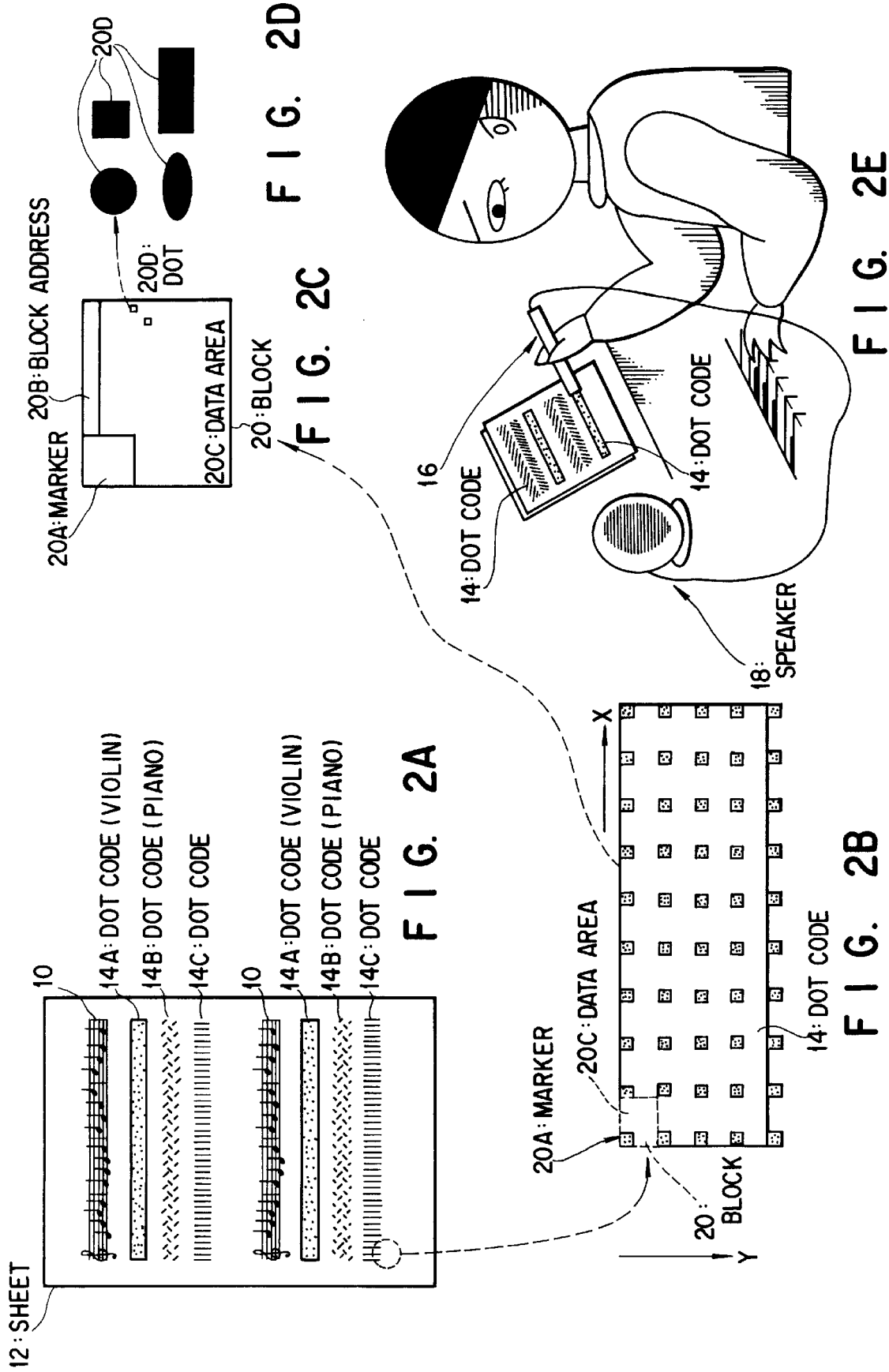
FIGS. 2A to 2E are views for illustrating an optically readable code recorded on a recording medium in the first embodiment.

For example, it is assumed that the recording medium is a sheet 12 on which a musical score 10 is printed as shown in FIG. 2A and a plurality of dot codes 14 (that is, 14A, 14B, 14C) are printed and recorded on the sheet.

The code information reading section 3, code information decoding section 4, decoded information synthesizing section 7, and D/A converter 5 are disposed in one portable case and are constructed as a pen type reproducing device 16 as shown in FIG. 2E, for example.

Figure 3:
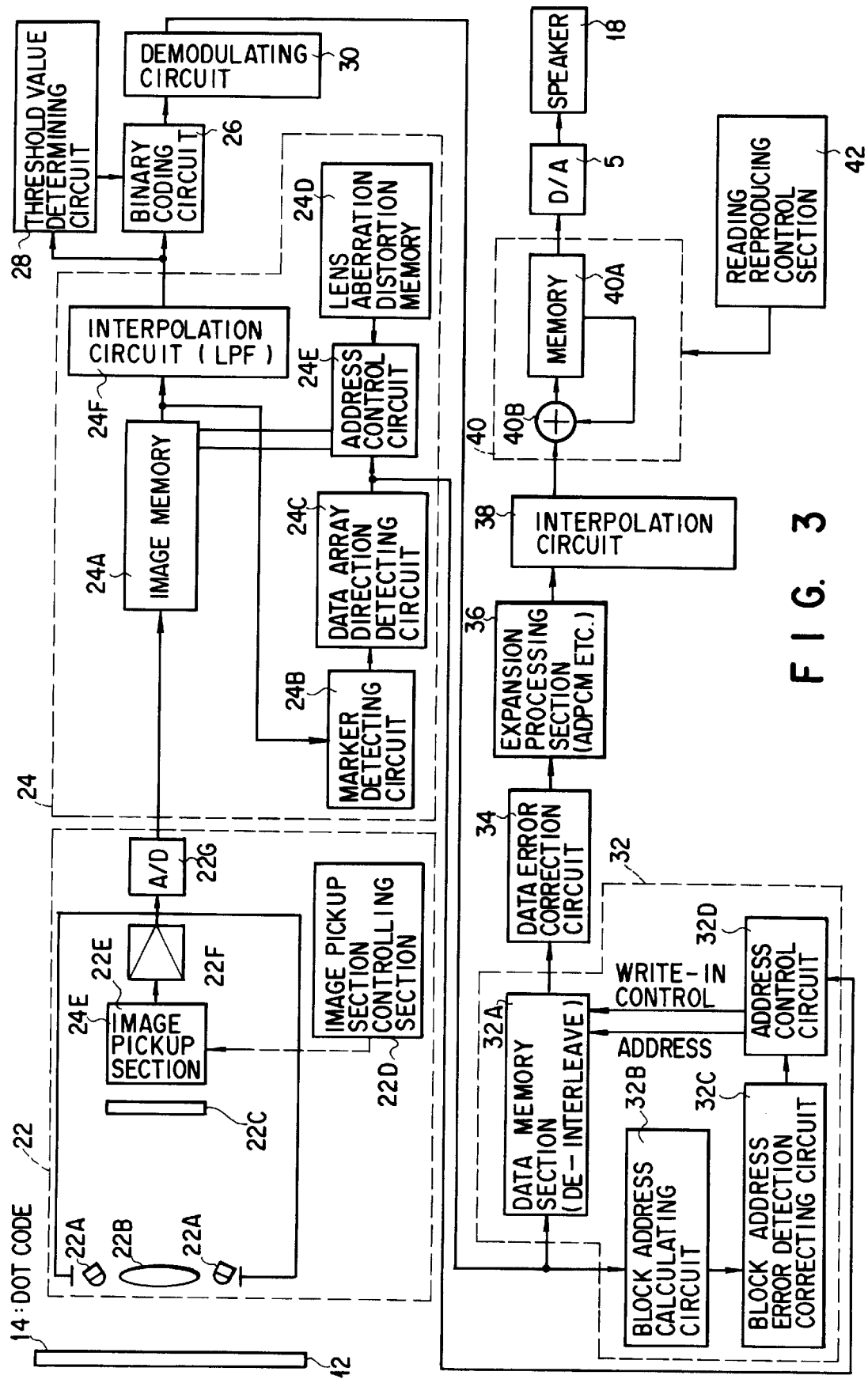
FIG. 3 is a block diagram showing the actual construction of an audio information reproducing device according to the first embodiment.

Further, the audio output section 6 comprises a speaker 18 as shown in FIG. 3.

With the above construction, by moving the pen type reproducing device to sequentially trace the dot codes 14 one by one by first selecting a desired one of the dot codes 14A, 14B and 14C and moving the pen type reproducing device 16 to trace the selected dot code, and then, trace another dot code, all of the traced dot codes 14 are detected by the pen type reproducing device 16, and after all of them are synthesized, they are converted into an audio signal and output from the audio output section 6 such as the speaker 18.

For example, if the pen type reproducing device 16 is moved to trace the freely selected dot code 14A (corresponding to a violin) and the dot code 14B (corresponding to a piano), the dot codes are detected and synthesized so that the synchronized sounds of the violin and piano can be simultaneously heard.

The dot code 14 is a dot code explained in detail in International Application PCT/JP 93/01377 described before and comprises a plurality of blocks 20 arranged in the X-axis direction and Y-axis direction as shown in FIG. 2B. As shown in FIG. 2C, each of the blocks 20 includes a marker 20A, block address 20B and data area 20C. The minimum recording unit of the data area 20C is formed of a dot 20D as shown in FIG. 2D.

Next, the actual construction of the audio information reproducing device according to the first embodiment of this invention is explained with reference to the block diagram of FIG. 3.

A detecting section 22 has the same function as that of the image pickup section of a television camera or the like in principle. That is, a reflected light obtained by applying a light from a light source 22A to the dot code 14 on the sheet 12 which is a subject is detected as an image via an image forming optical system 22B such as a lens and a space filter 22C by an image pickup section 22E which is controlled by an image pickup section controlling section 22D, amplified by a pre-amplifier 22F, converted into a digital signal by an A/D converter 22G and then output.

The image pickup section 22E is comprises a semiconductor area sensor, for example, and the pixel pitch of the area sensor is set to be equal to or less than ½ of the dot pitch of the dot code on the image pickup surface according to the sampling theorem. Further, the space filter 22C disposed on the image pickup surface is provided to prevent occurrence of a moire phenomenon on the image pickup surface based on the above theorem. As shown in FIG. 4A, the image pickup area of the area sensor is set to be slightly larger than the width in the vertical direction of a preset dot code 14 which is defined to be read at one time by taking the unintentional movement of the hands when the detecting section 22 is manually scanned.

Next, an image signal detected by the detecting section 22 as described above is input to a scanning/converting section 24. In the scanning/converting section 24, the input image signal is first stored into an image memory 24A. The image memory 24A has an 8-bit gradation.

A marker detection circuit 24B scans the image information stored in the image memory 24A as shown in FIG. 4B so as to detect a marker 20A. At the same time, a data array direction detecting circuit 24C detects one of address values which lies on the image pickup surface and which corresponds to the marker 20A detected by the marker detecting circuit 24B and calculates an inclination angle $\theta$ of the image pickup surface to the arrangement direction of the dot code 14 based on the detected address value. Since the marker detecting circuit 24B cannot correctly calculate the inclination angle $\theta$ if the position thereof is rotated by 90° from the position shown in FIG. 4B and when the image of the dot code 14 is picked up, the scanning operation is effected in a direction perpendicular to the direction shown in FIG. 4B and a correct one of the results obtained by the scanning operations effected in two directions intersecting at right angles is selected.

A lens aberration distortion memory 24D stores previously measured aberration information of the lens used in the image forming optical system 22B of the detecting section 22 to correct the distortion of the lens. When data stored in the image memory 24A is read out, an address control circuit 24E supplies a readout address corresponding to the inclination angle $\theta$ calculated by the data array direction detecting circuit 24C and the lens aberration information stored in the lens aberration distortion memory 24D to the image memory 24A and effects the scanning/converting section in the data array direction while effecting the data interpolation in an interpolation circuit 24F.

Next, the dot code subjected to the scanning/converting process and read out from the image memory 24A as described above is binary-coded by a binary-coding circuit 26. The threshold value used when the binary coding operation is effected is determined by use of a value of a histogram or the like for each image plane or each block in the image plane in a threshold value determining circuit 28. That is, the threshold value is determined according to the stain on the dot code, the distortion of paper or the precision of a built-in clock. As the threshold value determining circuit 28, it is preferable to use a circuit utilizing a neural network as is disclosed in Jpn. Pat. Appln. KOKAI Publication No. 5-328133 of the assignee of the applicant of this invention, for example.

Next, data binary-coded by the binary-coding circuit 26 is demodulated by a demodulating circuit 30. The demodulated data is input to a data memory section 32A and a block address calculating circuit 32B of a data string adjusting section 32 and each block address is detected. The detected block address is processed by a block address error detection/correction circuit 32C in which whether or not an error is present in the x, y address data is determined or error correction is effected by use of an error determination code in the block. When no error is detected or the error is corrected, an address control circuit 32D controls the address of the data memory section 32A and the data is subjected to the de-interleaving process and converted into a correct data string.

Next, the audio dot code having the data string adjusted by the data string adjusting section 32 is processed by a data error correction circuit 34 in which the error correction is effected by use of an error correction code in the block. Then, data previously compressed by ADPCM (Adaptive Differential Pulse Code Modulation) or the like at the time of coding is decoded by the expansion process by an expansion processing section 36 and audio data which is impossible to be corrected is subjected to the interpolation process in a data interpolation circuit 38.

Further, the digital audio data subjected to the interpolation process by the data interpolation circuit 38 is stored in a memory 40A of a data synthesizing circuit 40. The data synthesizing circuit 40 adds the digital audio signal output from the data interpolation circuit 38 to the audio signal in the memory 40A in an adder circuit 40B and stores the result of addition into the memory 40A.

In the above operation, a reading/reproduction controlling section 42 controlled by the sound reproduction starting operation by the user (not shown) causes the data synthesizing section 40 to terminate the addition of audio signals output from the data interpolation circuit 38 and output the result of addition.

Digital audio information synthesized by the data synthesizing section 40 is converted into an analog audio signal by the D/A converter 5, and then the converted audio signal is amplified by a conversion amplifier (not shown) and output from the audio output section 6 such as the speaker 18.

The dot code 14 is one of the codes obtained by coding different audio information items, the pen type reproducing device 16 sequentially reads desired ones of a plurality of dot codes 14, the above operation is repeatedly effected each time the pen type reproducing device 16 reads the recording data, and audio data items sequentially output from the data interpolation circuit 38 are sequentially added together by the data synthesizing section 40. The operation is repeatedly effected until it receives a data synthesizing interruption signal from the reading/reproduction controlling section 42 by the user's operation.

This operation will be further described in greater detail hereinbelow with respect to an example. The following example is related to the inhibiting step of the synthesizing operation in the case where a plurality of data read from a plurality of codes are synthesized and output, and the starting step of data reproduction. In this example, a method of control using software will be described, but the same control can be obtained without software, by incorporating the similar function into the hardware of the device.

Figure 8:
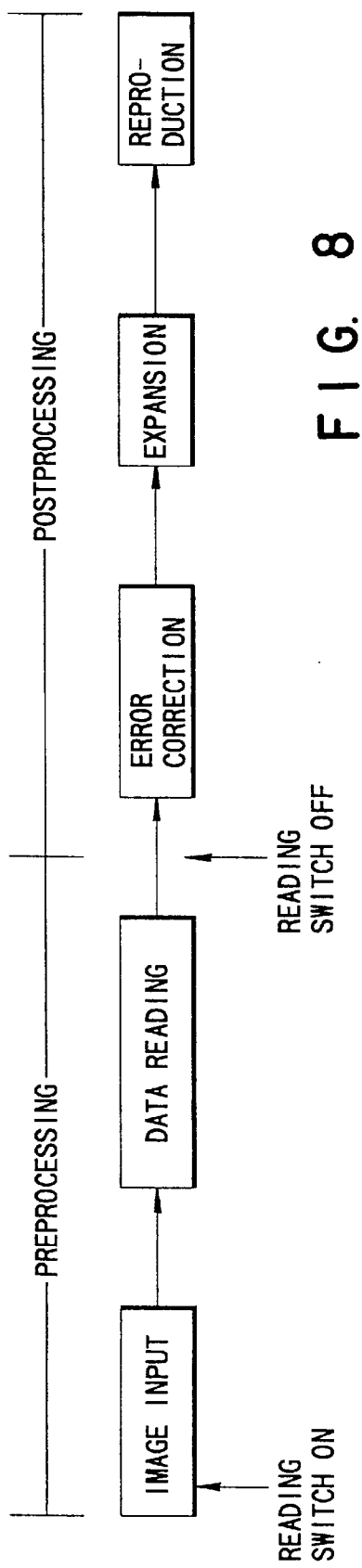
FIG. 8 shows a specific example of the operation of the audio information reproducing device in the first embodiment.

The process of obtaining the audio information signal from codes comprises five steps, as shown in FIG. 8. Preprocessing is executed while a reading switch is set in an ON state. The preprocessing comprises an inputting step of inputting an image (i.e., code); and a storing step of storing in a memory data each block of the image data read from the input image. Postprocessing is executed after the reading switch is turned off. The postprocessing includes a generating step of generating reproduction data by executing error correction of the data obtained in the preprocessing; an expansion step of expanding the reproduction data in accordance with the compression method by which the reproduction data is compressed if the reproduction data is compressed; and a reproducing step of reproducing the reproduction data.

Figure 9:
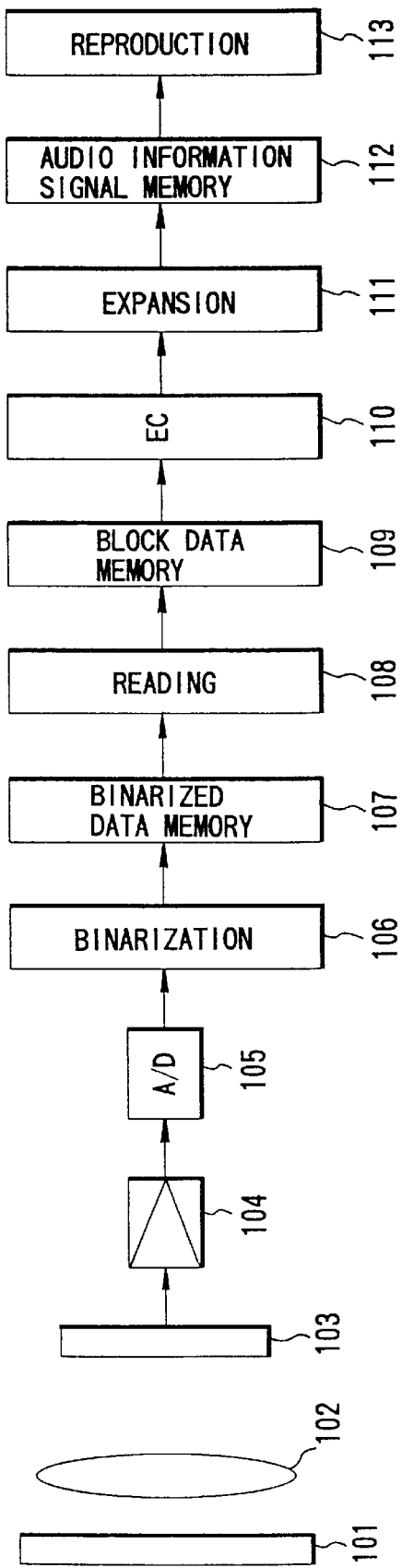
FIG. 9 is a block diagram showing an information reproducing device for obtaining a reproduction signal from a code.

The process of obtaining the reproduction data signal from the codes will be more specifically described below with reference to FIG. 9 in which the reproduction of an audio signal is shown.

When the reading switch of a camera is switched on, the camera is set in an active state. The camera in the active state obtains the image suggested as a code 101 by inputting the image on a CCD 103 using an objective lens 102, and then A/D converts the image data using an A/D converter to be input to the binarization processing section 106. The binarization processing section 106 determines a proper binarization threshold value, and the image data is binarized using the threshold value. The binarized image data is stored in a binarized data memory 107.

A reading section 108 reads data from the binarized data memory 107 to store the data in a block data memory 109. In the preferred embodiment of the present invention, the reading-out step is executed as follows. The binarized image data in the binarized image data memory is raster-scanned to detect markers by a marker detecting section, and the data in a data region between the adjacent markers is read. A block address detecting section then obtains a block address of a desired block, and a crossing point of the divisional lines which vertically and horizontally divide the data region present between the adjacent markers is detected as a data reading point. Then, the data at the reading point is read from the binarized data memory, and recorded in the block address of the block data memory.

The data in each of the blocks read in this manner is then subjected to an error correction process in an error correction (EC) section 110. Subsequently, in order to decode the data signal so as to be converted into audio information, the data is expanded in an expansion section 111 in accordance with the compression method by which the reproduction audio data subjected to the error correction process is compressed, and recorded in an audio signal data memory 112. In many cases, the audio signal data memory 112 is used as a buffer for the reproduction of the audio information, and thus does not need to have the memory capacity equal to all the reproduction audio data capacity since the reproduction is executed every time that a predetermined amount of data is input into the memory. When the data has not been subjected to a process such as compression, the expansion step is skipped since the data can be reproduced without such a decoding process. Thus, the audio information signal is reproduced in a reproduction section 113 in accordance with the reproduction method suitable for each of the audio information signals.

The audio information signal referred to in this example includes a signal such as a MIDI (Music Instrumental Digital Interface) signal which is a code representing a tune using information representing the tones of musical instruments on a computer. A MIDI code is reproduced by simply being converted into an audio information signal using a CPU installed in the information reproduction device, or by transmitting the audio information signal data to the computer having its own sound source so as to be processed in the computer.

The process flow will be described next in conjunction with FIG. 11, in which the reading switch of the device shown in FIG. 10 is turned off and the reproduction of the data is not executed.

When the reading switch of the camera is turned on, the input device 301 is set in an active state responsive to an instruction from a CPU 303. The image is then input to the input device 301 set in the active state, and binarized to be stored in an image data memory 305. The data read from the image data is then recorded in a block data memory 306. The date of each of the blocks of the image data read in this manner is stored in a synthesized data memory 308 after being subjected to the error correction process. The CPU 303 expands more than one data stored in the synthesized data memory, and the expanded data are recorded in an audio information signal memory 307, and then output as audio sound from the speaker of an audio signal outputting device 304.

After the block data memory is cleared by the initialization after the reading operation is started (step 8-1), the data read in the preceding step (step 8-2) is stored in the block data memory. When the reading switch is turned off, the data stored in the block data memory is transmitted to the error correction section to be subjected to the error correction process, and then stored in the synthesized data memory (step 8-3). A timer is thereafter started, and the reading switch is placed on stand-by (step 8-4). When the reading switch is turned on before a predetermined period of time has passed, the preprocessing is executed again, and the read data is subjected to the error correction process and then stored in the free area of the synthesized data memory. These steps are repeatedly performed.

In contrast, when the reading switch is not turned on within the predetermined period of time (step 8-5), it is determined that time is up, and a plurality of data read by the time are expanded in order to synthesize the data, and then reproduced (step 8-6). In this case, the data is stored in the synthesized data memory after the error correction process is executed. This is because, the synthesized data memory stores data from which an error correction signal is deleted, and thus the capacity of the memory for storing the data to be synthesized can be decreased as compared to the case where the memory storing the data subjected to the expansion process.

Thus, the data which has been subjected to the expansion process or the data not subjected to the error correction process can be stored as the data to be synthesized. By storing such data, the following advantages can be attained. In the former case, the expansion process is not executed during the period of time between the time when the time is up and the time when the reproduction is started, and it is advantageous that the reproduction can be immediately started. In the latter case, though the block addresses of the codes to be read needs to be different from each other, and thus the data to be synthesized does not need to be transmitted and can be stored in the block data memory, and the synthesized memory does not need to be provided. Since the codes have block addresses different from each other, the data having the block address other than the block address of the data which was scanned immediately before is read and added unless the data stored in the block data memory is cleared.

The changing method of changing the code to be reproduced by double-clicking will now be described. When a popular input device such as a mouse is used, various operations can be executed by clicking the mouse button once or twice in a rapid succession (i.e., a single-click or double-click). The computer detects the sequential clicking within a predetermined period of time, and counts the number of the click. By detecting the clicks in this manner, the user can attain the various operations without using a plurality of buttons.

In the present invention, when a double-click is performed, reproduction of the data is initiated. The specific example of the double-click operation will now be described with reference to the flow chart shown in FIG. 12. When the switch of a data-input pen is detected to be turned on (701), a flag FLG representing the occurrence of the double-click is reset (702), and a timer is started (703). After a reading step (704) is repeatedly executed and the user detaches his/her finger from the switch (705), the period of time passed from the switching-on is compared with the threshold value TH (706). When the passed time is sufficiently shorter than the threshold value (the threshold value TH is a very short period of time during which a button is clicked once), it is determined whether or not the flag FLG is present therein (707). When the flag FLG is not present, it is determined that the first click is performed, and the timer is reset and started again (708). The device is then set in a waiting state till the switch is turned on again, and when the switch is turned on, the time passed by the time of the turning-on is compared with the threshold value TH(710). When the passed time is sufficiently shorter than the threshold value, the flag FLG is set (711) and the step (703) is executed again to reset and start the timer and perform the reading step again. Similarly, when the passed time of the second reading operation is sufficiently short, the flag is set in the step (707), a data synthesis inhibiting signal is output (713), and then postprocessing (714) is executed.

When the passed time of the reading operation is not determined to be sufficiently short to be regarded as a click in this time (706), the reading is determined to be a normal reading operation, and the time is reset (712). It is then determined using a threshold value TH2 whether or not the time is up while the button is not pushed down (715, 716), and when it is determined that the time is up, the postprocessing (714) is executed to process the information which has been read by that time. When the switch is turned on again before the time is up, the timer is reset in order to start the reading operation (703).

FIG. 13 shows an example of the tune data represented by the MIDI data. Codes 1–4 represent different parts of a tune. For example, code 1 represents the sound of a piano, code 2 represents the sound of a violin, code 3 represents the sound of a bass, and code 4 represents the sound of a percussion, so that when the information of all the codes are read, all the parts of the tune are simultaneously played. When only one of the codes is read and the data synthesis inhibiting signal is output by means of the above-described double-click operation, for example, only the sound represented by the read code is output.

The data synthesis inhibiting signal output can be also attained by scanning a data synthesis inhibiting code present below the tune codes, as shown in FIG. 14.

Figure 15:
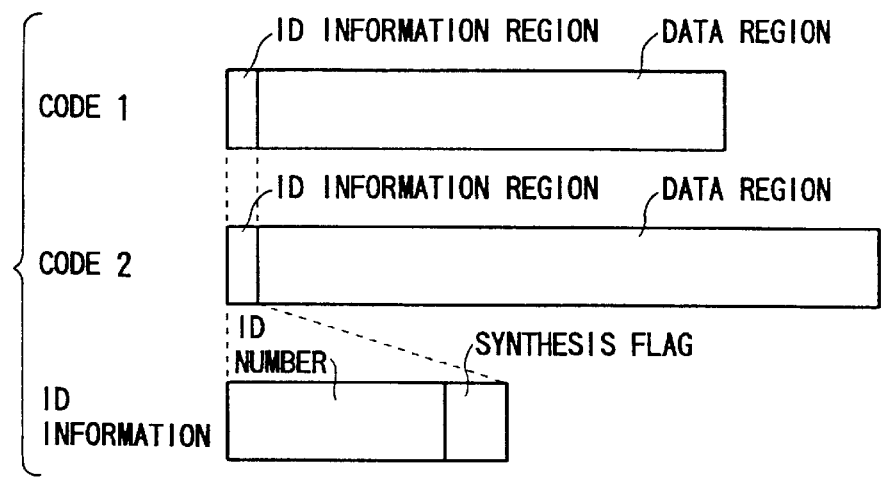
FIG. 15 shows a data format of each code to be synthesized.

In order to properly output the synthesized data, it is desirable that a data property checking mechanism for checking the data read at every scanning be provided to either the reading device or each of the codes. The following is a description of an exemplary data property checking mechanism. In the example shown in FIG. 15, the synthesized data is output only when each of the codes 1 and 2 includes ID information having ID numbers, and a data synthesis flag indicates that the data can be synthesized and that all the ID numbers are identical. In this example, the data synthesis flag is included in each of the codes as data representing that the data can be synthesized. The process flow when the codes as described above are read will now be described below with reference to the flow chart of FIG. 16.

At first, when an ID information region stores some information, the ID number and/or data synthesis flag are read simultaneously with data in a data reading step (801). Next, it is determined whether or not the data can be synthesized by determining whether or not the synthesis flag is present (802). When the data is not permitted to be synthesized (i.e., single audio information outputting mode, the postprocessing is unconditionally executed to reproduce data when the reading switch is turned off, and then single audio information corresponding to the read code is output to be reproduced. When the data is permitted to be synthesized (i.e., synthesized audio information outputting mode), the postprocessing is not executed until the data synthesis inhibiting signal is output, but the reading operation is continuously executed (804). This data synthesis inhibiting signal can be output by a double-click operation, by a user's instruction such as the data synthesis inhibiting code, or by an instruction which is automatically output in response to an operation such as detection of time-up.

In the synthesized audio information outputting mode, it is determined from the ID number, which type of the synthesis is executed: the simultaneous synthesis (in which the phase (outputting timing) of the read audio information data is synchronized and simultaneously reproduced); and the sequential synthesis (in which the read audio information data is put in a proper order and simultaneously reproduced).

More specifically, according to this method, when the data which are permitted to be synthesized are present in a plurality of codes, the data are synthesized such that the output mode is changed on the basis of the ID numbers which represent the information concerning the connection of the read data, such as synthesis type (simultaneous synthesis or sequential synthesis), and order (phase or timing to be synchronized in the synchronous synthesis, and the reproduction order in the sequential synthesis).

Figure 16:
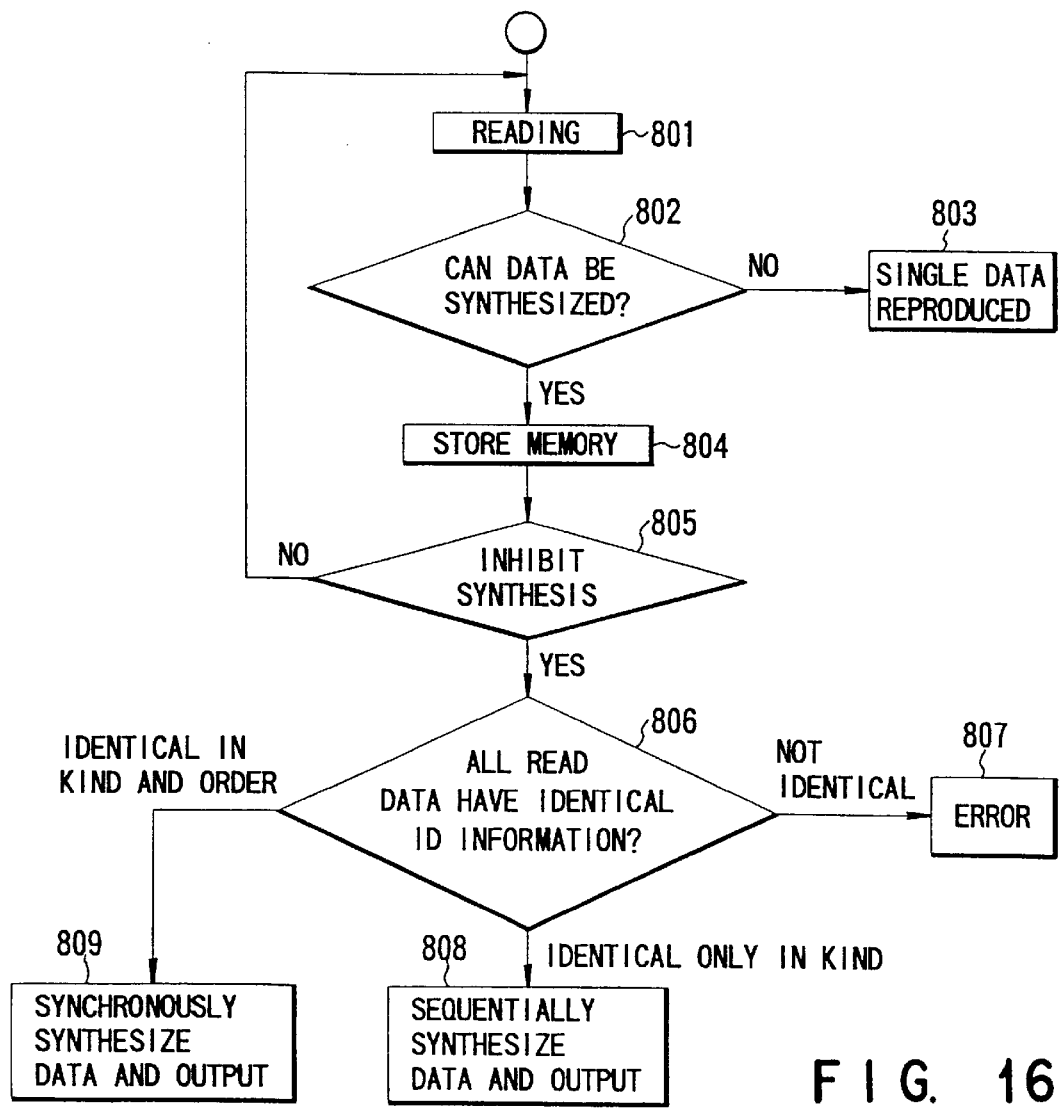
FIG. 16 is a flow chart showing a process using the codes shown in FIG. 15.

Still more specifically, as shown in the flow-chart of FIG. 16, a plurality of codes which can be synthesized are read, it is then checked (806) whether or not the codes are identical in the ID information after the synthesis is inhibited (805). The data synthesis method is then switched, as follows. When the ID information of all the codes are identical in the synthesis type and order, the synchronous synthesis is executed. When the ID information of all the codes are identical only in the type and differ in order, the sequential synthesis is executed in accordance with the order of the ID numbers.

Thus, the error correction (807) of the present invention enables a plurality of codes which are totally different in ID number and quite irrelevant to each other to be prevented from being haphazardly synthesized.

In the audio information reproducing device of this embodiment, since individual recording codes (dot codes) are sequentially read out, the pickup area itself is sufficient if it can pick up one recording code irrespective of the amount of the recording codes.

Next, the second embodiment of this invention is explained with reference to FIGS. 5A–6.

The schematic construction of the second embodiment is the same as that of the first embodiment explained with reference to FIG. 1, but the operations of the respective parts are slightly different.

Figure 6:
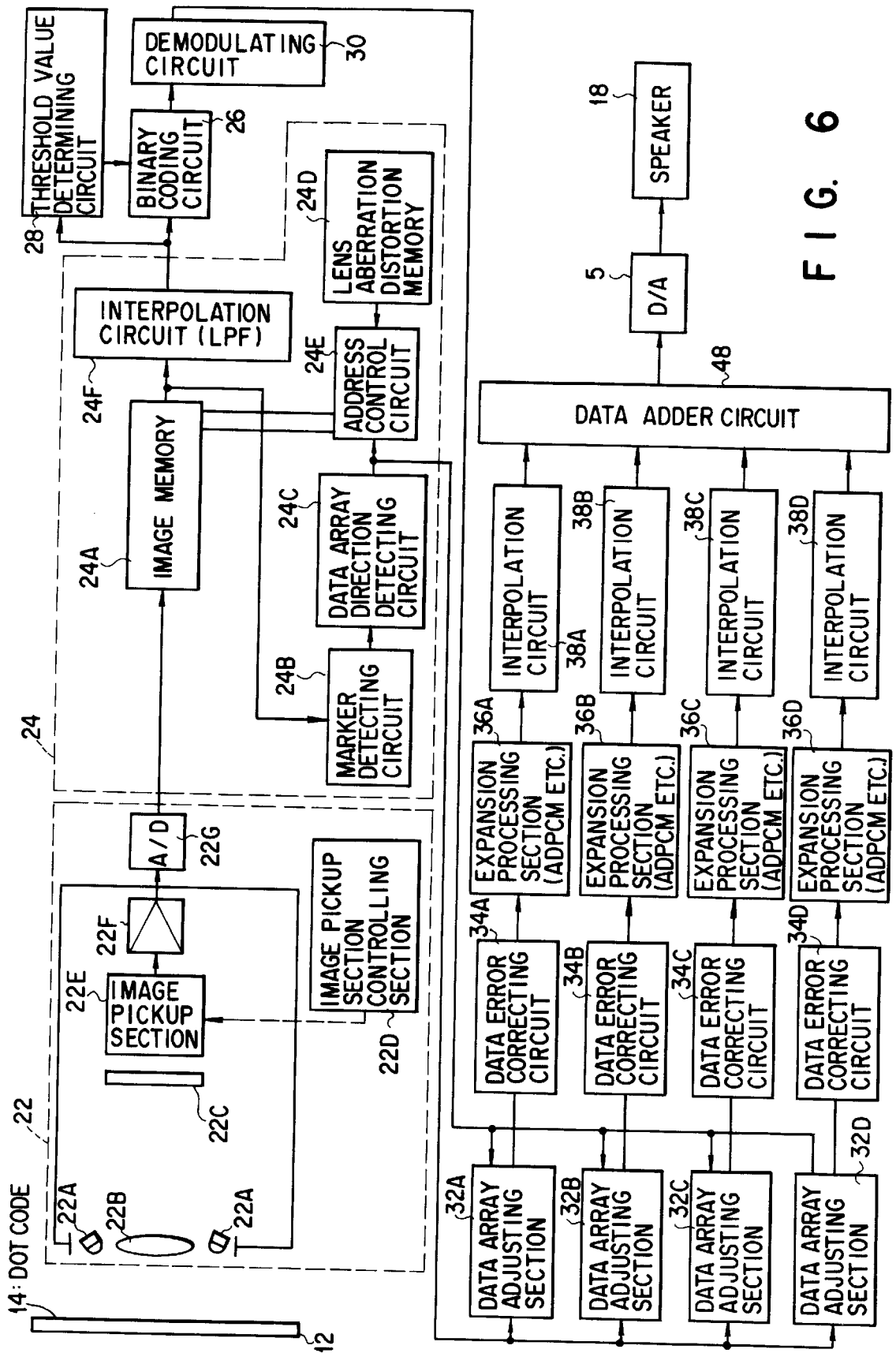
FIG. 6 is a block diagram showing the actual construction of an audio information reproducing device in the second embodiment.

Referring to FIGS. 5A–6, an audio information reproducing device of second embodiment includes a code information reading section 3 for selecting all of the recording codes which can be read by the code information reading section 3 from recording codes 2A, 2B, - - -, 2N recorded on recording media 1A, 1B, - - -, 1N and simultaneously optically reading all of the recording codes, a code information decoding section 4 for simultaneously decoding the recording codes read by the code information reading section 3, a decoded information synthesizing section 7 for synthesizing digital audio signals simultaneously decoded by the code information decoding section 4, a D/A converter 5 for converting the digital audio signal synthesized by the decoded information synthesizing section 7 into an analog audio signal, and an audio output section 6 for outputting the analog audio signal converted by the D/A converter 5 as an audio output.

In this case, the recording media 1A to 1N may be one sheet of recording medium. That is, a plurality of recording codes 2A to 2N may be recorded on one sheet of recording medium.

For example, it can be considered to use a recording medium in the form of a roll sheet 44 as shown in FIG. 5A and on which a plurality of dot codes 14A, 14B, 14C, 14D are printed and recorded.

The code information reading section 3, code information decoding section 4, decoded information synthesizing section 7, D/A converter 5 and speaker 18 used as the output section 6 are disposed in one case to construct a desk-top type reproducing device 46 as shown in FIG. 5E, and a detecting section 22 which can simultaneously detect a plurality of dot codes as shown in FIG. 5F is disposed in the desk-top type reproducing device 46 to form an audio information reproducing device. In this case, the detecting section 22 simultaneously traces all of the dot codes 14A to 14D to detect the dot codes 14A to 14D by feeding the roll sheet 44 at a constant speed, synthesizes the detected dot codes 14A to 14D and converts the synthesized result into a sound which can be heard via the speaker 18.

FIG. 6 is a block diagram of the desk-top type reproducing device 46 as the audio information reproducing device in the second embodiment of this invention.

In the reproducing device, the detecting section 22 is constructed such that it can simultaneously detect a plurality of dot codes 14A to 14D and is different from the detecting section of the first embodiment, and a portion containing the detecting section 22 to the demodulating section 30 is the same as that of the first embodiment.

In the reproducing device of this embodiment, a demodulated signal for each data demodulated for each recording data in the demodulating circuit 30 is supplied to data string adjusting sections $32_A$, $32_B$, $32_C$ and $32_D$. The construction of the data string adjusting sections $32_A$ to $32_D$ is the same as that of the data string adjusting section 32 of the first embodiment shown in FIG. 3. That is, the demodulated signal is input to a data memory section 32A and a block address calculating circuit 32B in each of the data string adjusting sections $32_A$ to $32_D$ and each block address is detected. The detected block address is processed by a corresponding one of block address error detection/correction circuits 32C in which whether or not an error is present in the x, y address data is determined or error correction is effected by use of an error determination code in the block. When no error is detected or the error is corrected, an address control circuit 32D controls the address of the data memory section 32A and the data is subjected to the de-interleaving process and converted into a correct data string. Next, the error correction using the error correction code in the block is effected in data error correction circuits $34_A$, $34_B$, $34_C$ and $34_D$. Then, data items compressed (by ADPCM or the like) are decoded by expansion processing sections $34_A$, $34_B$, $34_C$ and $36_D$ and audio data items which are impossible to be corrected are subjected to the interpolation process in respective data interpolation circuits $38_A$, $38_B$, $38_C$ and $38_D$. Further, the digital audio data items subjected to the interpolation process by the data interpolation circuits $38_A$, $38_B$, $38_C$ and $38_D$ are added together by an adder circuit 48.

Digital audio information synthesized by the data adder circuit 48 is converted into an analog audio signal by the D/A converter 5, and then the converted audio signal is amplified by a conversion amplifier (not shown) and output from the audio output section 6 such as the speaker 18.

The dot codes 14A to 14D are codes obtained by coding different audio information items and recording information input via different microphones, and if the detecting section 22 is constructed to mechanically scan the medium or scan the reading section, the unit of interleave of the dot code 14 can be reduced, and when audio information items are recorded on a real time base at the recording time, it becomes possible to effect the synthesizing and reproducing operations on the real time base and it becomes possible to visually understand the relation of variations in sounds with time.

Further, if the detecting section 22 is constructed to mechanically scan the medium or scan the reading section, the image pickup section 22D can be constructed to contain a line sensor.

The recording medium to which time information is visually given can be used as a script or report in which a plurality of voices are recorded, and when the pen type reproducing device of the first embodiment is used, it is possible to repeatedly reproduce only the conventional dot code.

Next, the third embodiment of this invention is explained. The third embodiment is an example in which recording codes 2A to 2N are recorded on a plurality of recording media 1A to 1N unlike the first and second embodiments in which a plurality of recording codes are recorded on one sheet of recording medium.

Figure 7:
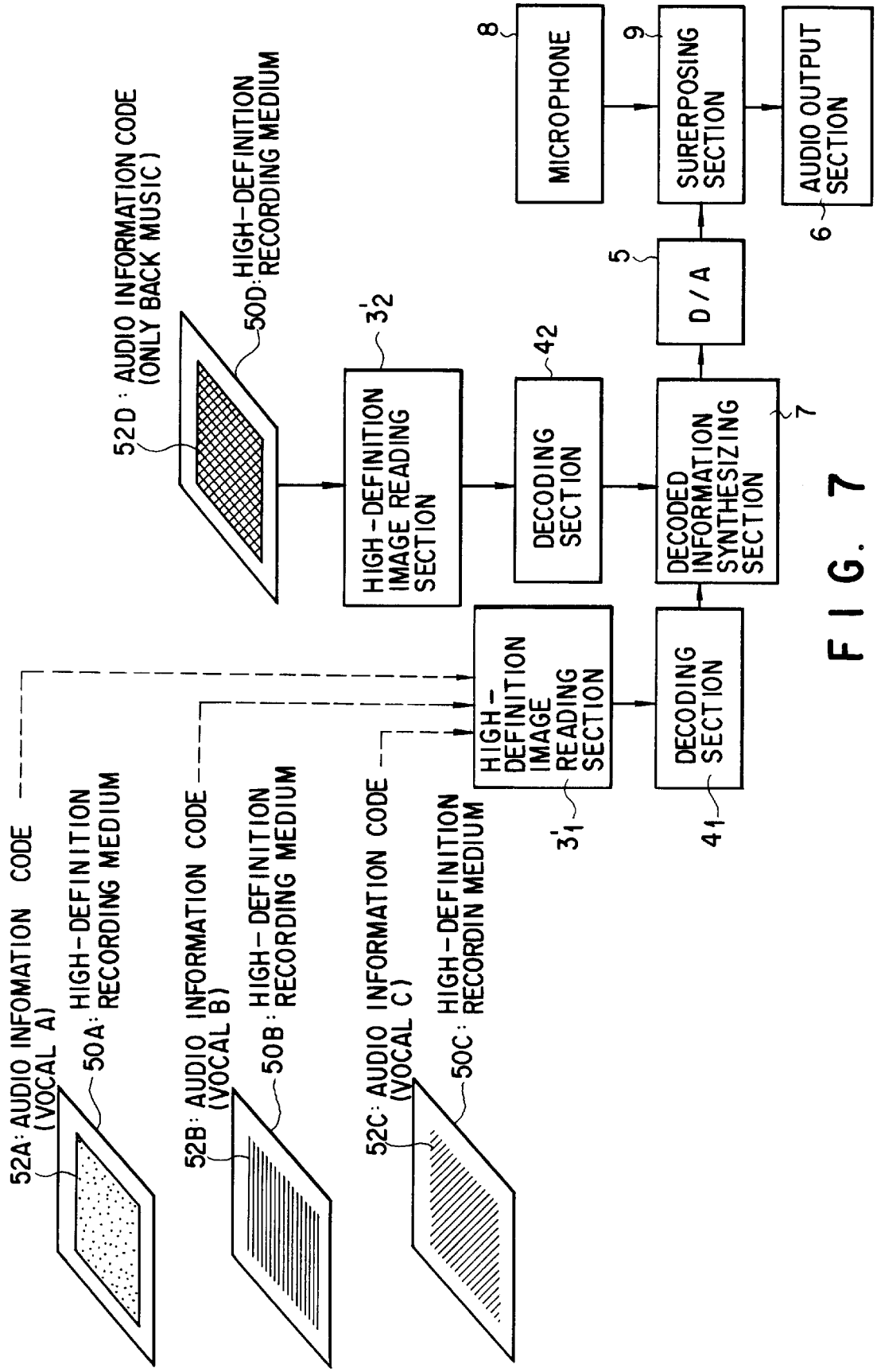
FIG. 7 is a diagram showing the schematic construction of a third embodiment of the invention.

FIG. 7 is a diagram showing the construction of an audio information reproducing device of this invention applied to a "KARAOKE" system.

It is assumed that audio information items 52A, 52B, 52C and 52D are recorded with high resolution on high-resolution recording media 50A, 50B, 50C and 50D such as paper of good quality or positive film.

The reproducing device of this embodiment includes a high-definition image reading section $3'_1$ for selecting one of the high-resolution recording media 50A, 50B and 50C and optically reading a corresponding one of the audio information codes 52A, 52B and 52C, a decoding section $4'_1$ for decoding a digital audio signal from one of the audio information codes 52A, 52B and 52C read by the high-definition image reading section $3'_1$, a high-definition image reading section $3'_2$ for selecting the high-resolution recording medium 50D and optically reading the audio information code 52D, a decoding section $4'_2$ for decoding a digital audio signal from the audio information code 52D read by the high-definition image reading section $3'_2$, a decoded information synthesizing section 7 for synthesizing the digital audio signal output from the decoding section $4'_1$ with the digital audio signal output from the decoding section $4'_2$, a D/A converter 5 for converting the digital audio signal synthesized by the decoded information synthesizing section 7 into an analog audio signal, a microphone 8 for inputting a voice from the exterior on the real time base, a superposing section 9 for superposing the voice input from the exterior via the microphone 8 on the analog audio signal converted by the D/A converter 5, and an audio output section 6 for amplifying an audio signal obtained by superposing the externally input voice on the analog audio signal and outputting the amplified audio signal to the exterior.

In this case, it is assumed that the unit of inter-leave of audio information is set to a reduced value so as to make it possible to reproduce a sound on the real time base.

The operation of the above device is explained below.

The sound recording code 52D is obtained by compressing/coding and recording audio information only of a musical performance of the music in the "KARAOKE" system. For example, if the recording code is recorded on a 35 mm positive film with high definition and high gradation, it can be read with approx. 6000 dpi by use of an existing film scanner with ordinary definition and low cost.

Therefore, if the compressed audio data is recorded in a 2-dimensional manner on the entire surface of a positive film which can be optically read by a film scanner, a piece of music can be sufficiently recorded. If the positive film is used, it can be treated while it is fixed on a frame used for a lantern slide, characters of the title and writer can be printed on the frame, and the contents thereof and the starting portion can be printed by use of optically readable codes. The user can set the above frame on the high-definition image reading section $3'_2$ such as a film scanner. The audio information code 52D read by the high-definition image reading section $3'_2$ is decoded in the unit of interleave by the decoding section $4_2$ and sequentially supplied to the decoded information synthesizing section 7.

On the other hand, the sound recording codes 52A, 52B and 52C are obtained by compressing/coding and recording audio information such as a singing voice and back-chorus which can be reproduced in synchronism with the performance of the music. One of the high-resolution recording media 50A, 50B and 50C on which part of the voice is recorded is selected and set on the high-resolution reading section $3'_1$, and then the sound recording code selected in synchronism with the high-resolution reading section $3'_1$ is optically read, sequentially decoded in the unit of interleave in the decoding section $4_1$ and sequentially output to the decoded information synthesizing section 7.

Therefore, it is assumed that data items sequentially supplied from both of the decoding sections $4_1$, $4_2$ are synchronized from the starting portion of the audio information.

The signal synthesized by the decoded information synthesizing section 7 is converted into an analog audio output by the D/A converter 5.

At this time, a voice input which is supplied from the exterior via the microphone 8 and synchronized with the above audio output is superposed on the audio output by the superposing section 9, and the result of superposition is output via the audio output section 6 such as a speaker.

The voice input from the microphone 8 is a voice of the user or the like input on the real time base, the audio information code 52D is only the music performance, and the audio information codes 52A, 52B, 52C may be a singing voice of a singer which may be used as an original sample, a singing voice of a user's favorite singer, a singing voice of a singer with whom the user wants to make a duet, a bass, a back-chorus and the like, and thus a desired number of singing voices can be prepared.

When a 35 mm positive film is used as the recording medium. It does not occupy a large space as the recording medium, it is light and easy to handle and difficult to be destroyed, it is not degraded by magnetization, it is not worn out since it is optically read, and it can be printed on a large scale since it is easy to make an additional print, and the voice of a person via the microphone 8 can be easily recorded on the positive film as the sound recording code so that it can be formed at an extremely lower cost than when it is formed as a compact disk (CD).

Further, even if a special medium is not used, the user can enjoy wide and desired combinations of codes as a "KARAOKE" performance.

In the first to third embodiments, a case wherein three or four codes are used as a plurality of codes is explained, but this invention is not limited to the above embodiments, and a desired number of codes can be used by preparing a processing section necessary for the number of codes.

As described above, according to this invention, an audio information reproducing device is provided which can repeatedly and freely reproduce only a desired portion of audio information such as a voice and music recorded in the optically readable form, synthesize desired sounds, simultaneously output them and efficiently reproduce the sounds.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. An audio information reproducing device comprising:
    reading means for optically reading one or a plurality of desired codes by a manual scanning operation including sequentially selecting the desired codes from at least one recording medium on which a plurality of audio information are recorded after being converted into optically readable code;
    reverse conversion means for reversely converting the desired codes sequentially and selectively read by said reading means into audio information items; and output means for outputting said audio information items which are produced by said reverse conversion means, said output means including:

synthesizing means for synthesizing and outputting the audio information items which are produced by said reverse conversion means and which correspond to the desired codes sequentially and selectively read by said reading means, said synthesizing means outputting an audio information item corresponding to one desired code when said one desired code is read by the reading means, said synthesizing means outputting synthesized audio information obtained by synthesizing the plurality of audio information items which correspond to the plurality of desired codes when said plurality of desired codes are read by said reading means sequentially and selectively under a predetermined condition.

2. An audio information reproducing device according to claim 1, wherein the synthesized audio information is synchronously synthesized audio information which are obtained by processing the audio information items produced by the reverse conversion means and corresponding to the plurality of codes in such a manner that the audio information items are synchronized with one another.

3. An audio information reproducing device according to claim 1, wherein the synthesized audio information is sequentially synthesized audio information which are obtained by processing the audio information items produced by the reverse conversion means and corresponding to the plurality of codes in such a manner that the audio information items are sequentially arranged.

4. An audio information reproducing device according to claim 1, wherein said predetermined condition under which the synthesizing means operates corresponds to read time intervals at which said reading means reads one desired code and then reads another desired code.

5. An audio information reproducing device according to claim 4, wherein said synthesizing means outputs synthesized audio information based on the desired codes read by the reading means when the time intervals at which the reading means reads desired codes are within a predetermined range.

6. An audio information reproducing device according to claim 4, wherein said read time intervals are operation time intervals at which a read start switch is manually operated so as to read said one code and said another code in succession.

7. An audio information reproducing device according to claim 1, wherein:

at least some of the desired codes recorded on the recording medium include not only audio information but also ID information, said ID information allowing synthesis with audio information represented by other codes and output as resultant information; and wherein said synthesizing means detects the ID information from the codes read by the reading means and outputs predetermined audio information corresponding to the ID code.

8. An audio information reproducing device according to claim 1, wherein said synthesizing means comprise a single audio information item outputting mode in which a single audio information item corresponding to said one desired code reversely converted by said reverse conversion means is output when said reading means reads said one desired code, and a synthesized audio information item outputting mode in which a plurality of audio information items corresponding to said plurality of desired codes which are reversely converted by said reverse conversion means are synthesized together and output as a synthesized audio information item when said reading means reads said plurality of desired codes sequentially and selectively under the predetermined condition.

9. An audio information reproducing device according to claim 8, wherein said recording medium further includes a control code which is optically readable by a manual scan and used for switching the synthesizing means from the synthesized audio information item outputting made to the single audio information item outputting mode.

10. An audio information reproducing device according to claim 8, wherein said synthesizing means is switched from the synthesized audio information item outputting mode to the single audio information item outputting mode by detecting whether or not a read start switch used for starting code reading is sequentially turned on and off within a predetermined time period, and detecting whether or not a combination of sequential turning on and off operations is executed twice in succession.

11. An audio information reproducing device according to claim 8, wherein said synthesizing means is switched from the synthesized audio information item outputting mode to the single audio information item outputting mode by checking whether or not a predetermined length of time has elapsed after the reading means reads one desired code.

* * * * *